(12) United States Patent
Durge et al.

(10) Patent No.: US 9,558,076 B2
(45) Date of Patent: Jan. 31, 2017

(54) METHODS AND SYSTEMS OF CLOUD-BASED DISASTER RECOVERY

(71) Applicants: Sachin Baban Durge, Pune (IN); Kuldeep Sureshrao Nagarkar, Pune (IN); Ravender Goyal, Saratoga, CA (US); Amarsinh Vijay Patil, Pune (IN); Chaitanya Surendra Ramdasi, Pune (IN); Kulangara Kuriakose George, Pune (IN)

(72) Inventors: Sachin Baban Durge, Pune (IN); Kuldeep Sureshrao Nagarkar, Pune (IN); Ravender Goyal, Saratoga, CA (US); Amarsinh Vijay Patil, Pune (IN); Chaitanya Surendra Ramdasi, Pune (IN); Kulangara Kuriakose George, Pune (IN)

( * ) Notice: Subject to any disclaimer, the term of this patent is extended or adjusted under 35 U.S.C. 154(b) by 278 days.

(21) Appl. No.: 14/280,686

(22) Filed: May 19, 2014

(65) Prior Publication Data

US 2015/0331758 A1    Nov. 19, 2015

(51) Int. Cl.
| | | |
|---|---|---|
| G06F 17/30 | (2006.01) | |
| G06F 11/14 | (2006.01) | |
| H04L 29/08 | (2006.01) | |
| H04L 29/14 | (2006.01) | |

(52) U.S. Cl.
CPC ........... *G06F 11/1458* (2013.01); *G06F 11/14* (2013.01); *G06F 11/1453* (2013.01); *G06F 11/1464* (2013.01); *H04L 29/08* (2013.01); *H04L 29/14* (2013.01); *H04L 67/10* (2013.01); *G06F 11/1456* (2013.01); *G06F 2201/815* (2013.01); *G06F 2201/84* (2013.01)

(58) Field of Classification Search
CPC .............. G06F 11/1464; G06F 11/1453; G06F 11/1458; H04L 67/10
USPC ......................................... 707/640, 652, 654
See application file for complete search history.

(56) References Cited

U.S. PATENT DOCUMENTS

| | | | | |
|---|---|---|---|---|
| 6,944,788 B2 * | 9/2005 | Dinker | ................ | G06F 11/2041 714/11 |
| 7,562,110 B2 * | 7/2009 | Miloushev | ........ | G06F 17/30197 707/999.01 |
| 8,244,914 B1 * | 8/2012 | Nagarkar | ............. | G06Q 10/107 707/609 |

(Continued)

*Primary Examiner* — Phong Nguyen

(57) ABSTRACT

In one embodiment, a computer-implemented method includes the step of communicatively coupling with an application-server local area network (LAN). The physical servers are discovered in the application-server LAN. The applications running in one or more physical servers in the application-server LAN are discovered. The application data and the application metadata are captured. The application data and the application metadata are parsed. The unique data blocks of the application data and the application metadata are identified. The unique data blocks are uploaded to a cloud-computing platform. It is determined that the one or more physical servers running the application data and the application metadata is no longer available in the application-server LAN. A cloud-based appliance in the cloud-computing platform is placed in an operational state. An application associated with the application data and the application metadata is identified.

15 Claims, 5 Drawing Sheets

(56) References Cited

U.S. PATENT DOCUMENTS

| | | | |
|---|---|---|---|
| 2002/0120763 A1* | 8/2002 | Miloushev | G06F 17/30197 709/230 |
| 2003/0177411 A1* | 9/2003 | Dinker | G06F 11/2041 714/13 |
| 2004/0047354 A1* | 3/2004 | Slater | H04L 41/0896 370/400 |
| 2011/0167221 A1* | 7/2011 | Pangal | G06F 11/1453 711/117 |

* cited by examiner

METHODS AND SYSTEMS OF CLOUD-BASED DISASTER RECOVERY

BACKGROUND

1. Field

This application relates generally to data storage, and more specifically to a system, article of manufacture and method for cloud-based data and/or applications recovery.

2. Related Art

A remote, online, or managed backup service, sometimes marketed as cloud backup, is a service that provides users with a system for the backup, storage, and recovery of computer files. Additionally, many services are also hosted in remote cloud systems. Online backup providers and hosts can provide these type of service to customers (e.g. end users, clients). Online backup providers can maintain and manage physical servers host a variety of applications like virtual machines (VM's), Microsoft Exchange Servers, Microsoft (MS) SQL servers, file servers etc. Customers have come to expect continuous application uptime. However, physical disasters can take a remote online service offline. For example, Disaster may not be confined to a physical server but the entire site hosting the physical servers may go down. Consequently, customers cannot access the applications/data if the physical servers meet with a disaster. The longer the application downtime, the larger the impact to the users/business. Accordingly, improvements in these services can enable online backup providers to provide various forms of continuous back up protection and/or restoration.

BRIEF SUMMARY OF THE INVENTION

In one aspect, a computer-implemented method includes the step of communicatively coupling with an application-server local area network (LAN). The physical servers are discovered in the application-server LAN. The applications running in one or more physical servers in the application-server LAN are discovered. The application data and the application metadata are captured. The application data and the application metadata are parsed. The unique data blocks of the application data and the application metadata are identified. The unique data blocks are uploaded to a cloud-computing platform. It is determined that the one or more physical servers running the application data and the application metadata is no longer available in the application-server LAN. A cloud-based appliance in the cloud-computing platform is placed in an operational state. An application associated with the application data and the application metadata is identified. An instruction is received from a user, wherein the instruction comprises a selection of the application associated with the application data and the application metadata. The unique data blocks of the application data and the application metadata stored in the cloud-based platform are downloaded from cloud storage. The application data and the application metadata are reformatted into a native format supported by the cloud-based platform. A cloud-based appliance is associated with the application data and the application metadata is provided, wherein the cloud-based appliance, and wherein the cloud-based application manages an implementation of a cloud-based version of the application.

Figure 1A:
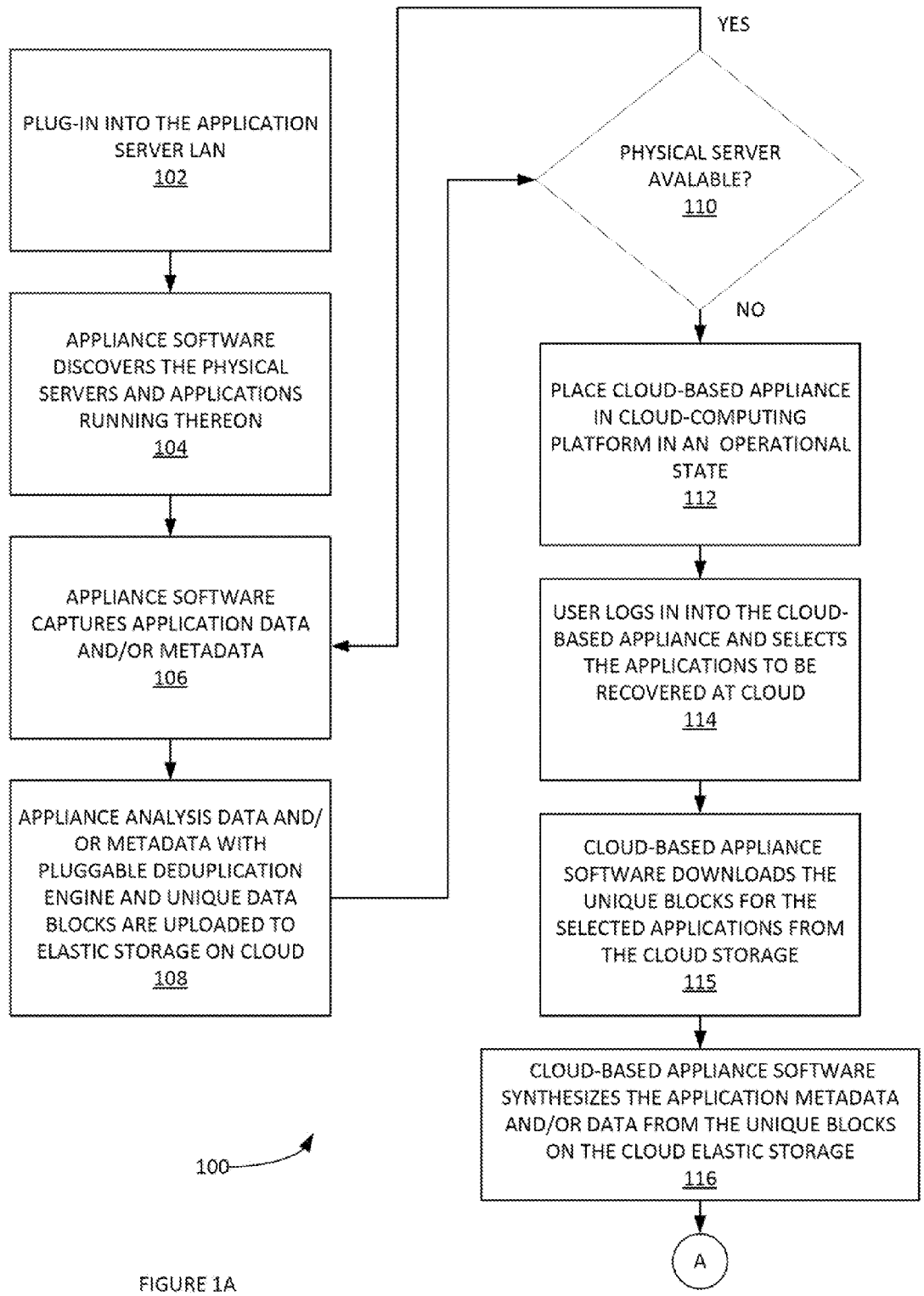
FIGS. 1A-B illustrate an example method for cloud-based data and/or application recovery, according to some embodiments.

The Figures described above are a representative set, and are not an exhaustive with respect to embodying the invention.

DESCRIPTION

Disclosed are a system, method, and article of manufacture of cloud-based disaster recovery. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application server can be, inter alia, a software framework that provides a generalized approach to creating an application-server implementation, regard to what the application functions are and/or the server portion of a specific implementation instance. The server's function can be dedicated to the execution of procedures (e.g. programs, routines, scripts) for supporting its applied applications. An application server can be an example of a physical server.

Azure® (Microsoft Azure) can be a cloud computing platform and infrastructure, created by Microsoft, for building, deploying and managing applications and/or services through a global network of datacenters. It provides both PaaS and IaaS services and/or supports various different programming languages, tools and/or frameworks (e.g. Microsoft-specific and/or third-party software and systems).

A backup, or the process of backing up, can refer to the copying and/or archiving of computer data so it may be used to restore the original after a data loss event.

Chunk can be the segments of data that are generated from a data stream by splitting the data stream at fixed or variable lengths. A chunk can be a specified fixed size or variable size.

Cloud computing can be computing that can involve a large number of computers connected through a communication network such as the Internet. Cloud computing can be a form of distributed computing over a network, and can include the ability to run a program or application on many connected computers at the same time.

Cloud storage can be a model of networked enterprise storage where data is stored in virtualized pools of storage which are generally hosted by third parties. Hosting companies can operate large data centers, and users can have data hosted by leasing storage capacity from said hosting companies. Physically, the resource can span across multiple servers and multiple locations.

Continuous data protection (CDP) can be backup of computer data by automatically saving a copy of every change made to that data. It allows the user or administrator to restore data to any point in time.

Elasticity can be the degree to which a cloud-computing system is able to adapt to workload changes by provisioning and deprovisioning resources in an autonomic manner, such that at each point in time the available resources match the current demand as closely as possible.

Hyper-V can be a native hypervisor that enables platform virtualization on x86-64 systems.

Infrastructure as a service (IaaS) can be physical machines, virtual machines, and/or other resources offered with a cloud-service model.

Local area network (LAN) can be a computer network that interconnects computers within a limited area such as a home, school, computer laboratory, or office building using network media.

MD5 message-digest algorithm hashing algorithm can cryptographic hash function producing a 128-bit (16-byte) hash value, typically expressed in text format as a 32 digit hexadecimal number.

New Technology File System (NTFS) is a proprietary file system developed by Microsoft.

Platform as a service (PaaS) can be a category of cloud computing services that provides a computing platform and a solution stack as a service.

Software application can be a group of software programs that execute the workflows related to backup and disaster recovery.

TIGER hashing algorithm can be a cryptographic hash function.

Virtual machine (VM) can be a software-based emulation of a computer. Virtual machines can operate based on the computer architecture and functions of a computer.

Exemplary Methods

In one embodiment, an application running on a physical server can be restored on cloud computing platform (e.g. a collection of remote computing service) when it is detected that the physical server is no longer available. An appliance can be co-located with the physical server to capture the application data and/or metadata. The data and/or metadata can be replicated to the appliance in a cloud computing platform that uses this information to perform disaster recovery.

Figure 1B:
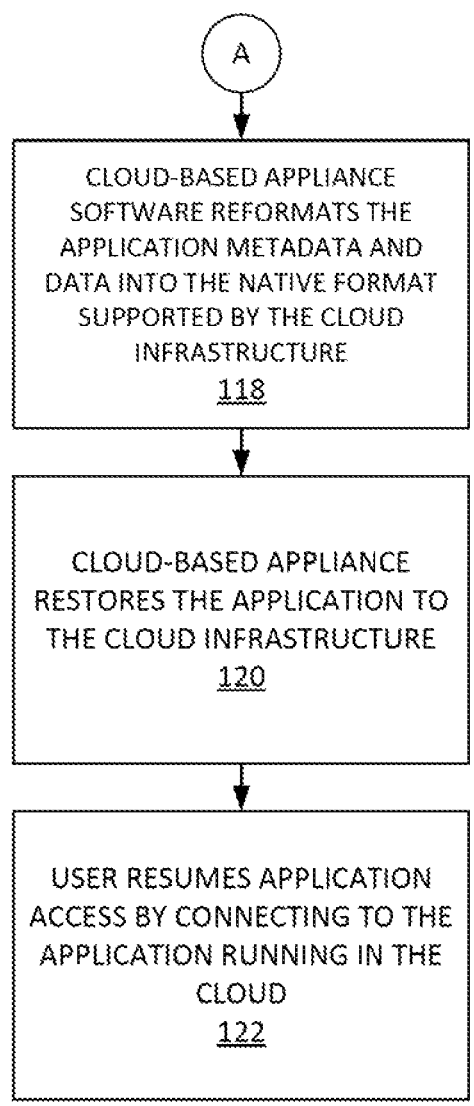

FIGS. 1 A-B illustrate an example method 100 for cloud-based data and/or application recovery, according to some embodiments. In step 102, an appliance module can be 'plugged into' an application server's LAN. For example, the appliance module can be co-located with the physical server. The appliance module can capture the application data and/or metadata. The appliance module can include pre-installed software application. The appliance can be configured to work with a user-selected cloud vendor (e.g. Google Cloud®, Appistry's CloudIQ®, Amazon Web Services®, gCloud3 gPlatform®, Microsoft Azure®, etc.). Accordingly, public clouds like Microsoft Azure, Amazon, etc. and/or private clouds (e.g. those built with OpenStorage stack), or any other technology are instances of a cloud-computing platform. The application server can an example of a physical server. In step 104, the appliance module discovers the physical servers and applications running thereon. For example, the appliance connects to the physical server using user provided credentials. After the connection is established, the appliance software can push a few executable programs to the physical system. These programs execute on the physical server and enumerate the different applications on it. This list is returned to the appliance.

In step 106, can capture application data and/or metadata. For example, the appliance module can capture the metadata and/or data of these applications periodically as scheduled and/or on an on-demand basis as invoked by a user. For example, the data can be captured from the snapshot. The snapshot can be created using a standard volume snapshot service (VSS) framework (e.g. a shadow copy service) that flushes the application data and/or creates a data consistent point-in-time copy. The data capture process can include two steps. The first step can involve the metadata of the application. The metadata can be backed up by querying the application interfaces and/or reading the known configuration parameters. The second step can involve the data backup. The data can be one or more files and/or data streams and/or raw disk streams.

In step 108, the appliance module can analyse the metadata and/or data using a pluggable deduplication engine. The deduplication engine can chunk a backup data stream. The deduplication engine can use a hashing algorithm to generate a hash for each chunk.—The hashing algorithm and/or chunk length can be specified for each deduplication engine. In one example architecture, the deduplication engine is pluggable in a sense that there can be different types of engines plugged in at a given point in time. For example, one deduplication engine can implement fixed size chunks and use MD5 message-digest algorithm hashing algorithm.

Another deduplication engine have implement variable size chunks and use TIGER (e.g. a 912) hashing algorithm. The unique data blocks are uploaded to elastic storage on a cloud-based platform. Analysis can include the following. The deduplication engine can be configured during appliance installation. All backup streams can be chunked by this deduplication engine and/or hashes can be generated. Additionally, a map can be generated for each backup stream. The map can provide the sequential order of hashes needed to synthesize the backup stream. The hashes and/and the map can form the metadata. It is noted that the data can be in a chunked format. These examples are provided by way of example and not of limitation.

In step 110, it can be determined if the physical server (e.g. the application server) is available (e.g. online, not subject to a disaster-related failure). If yes, then process 100 can return to an earlier step (e.g. 106). If no, then process 100 can proceed to step 112. In step 112, a cloud-based appliance module (not at the physical server location) can be placed in an operation state (e.g. available for performing application operations, providing stored backup data, etc.). For example, if the application and/or physical server and/or the server site meets with a disaster, a cloud-based appliance module at the cloud becomes operational. In step 114, a user can log into the cloud-based appliance. The user can view and/or selects the application(s) to be recovered from cloud-computing platform. In step 115, cloud-based appliance software can download the unique blocks for the selected applications from the cloud storage.

In step 116, the cloud-based appliance software synthesizes the application metadata and data from the unique blocks on the cloud elastic storage. The deduplication engine can ensures that the chunk is written once on the disk. For example, the deduplication engine can ensure that the data is written once to the disk attached to the appliance in the form of chunks. These chunks can be uploaded to the cloud. Thus, the chunks in the cloud can be unique. For each backup stream/image, there can be a map that has the sequence of hashes needed to synthesize the image. Along with the unique data chunks, the map can also be replicated to the elastic cloud-computing platform. To synthesize the backup stream/image on the cloud, the map can be accessed. The unique data chunks can be read and/or rearranged in a target file to be restored.

In step 118, the cloud-based appliance software can reformat the application metadata and/or data into a native format supported by the cloud-based platform infrastructure. The files are synthesized using the map and the unique data chunks. There can be an input parameter to the synthesis procedure. This input parameter can define the format in which the file has to be synthesized. In one example, the target platform formats can be open and known (e.g. VHD/VHDX for a HyperV system and/or VMDK for VMware system). For example, the original file format of the file can be VMDK (i.e. VM on a VMware platform). While restoring at Azure the synthesis procedure can obtain the reformate parameter as VHD and synthesizes the file in VHD format. The data can be the same but it is formatted as VHD instead of VMDK. This file is pushed to Azure infrastructure and run as a VM in the cloud.

In step 120, the cloud-base appliance can restore the application to the cloud infrastructure and start the application. In step 122, users can resume application access by connecting to a cloud-based version of the application running on the cloud-based platform.

In some example embodiments of process 100, a user the unique data of user-configured applications can be selectively replicated to the elastic cloud-based platforms data storage. The cloud-based appliance can be online only when required (e.g. when the application server is not available due to a disaster). Selective download of unique chunks from elastic cloud-based storage can be used to synthesize the cloud-based application. A reformat application data can enable provisioning it to the cloud-based platform.

Exemplary Systems

Figure 2:
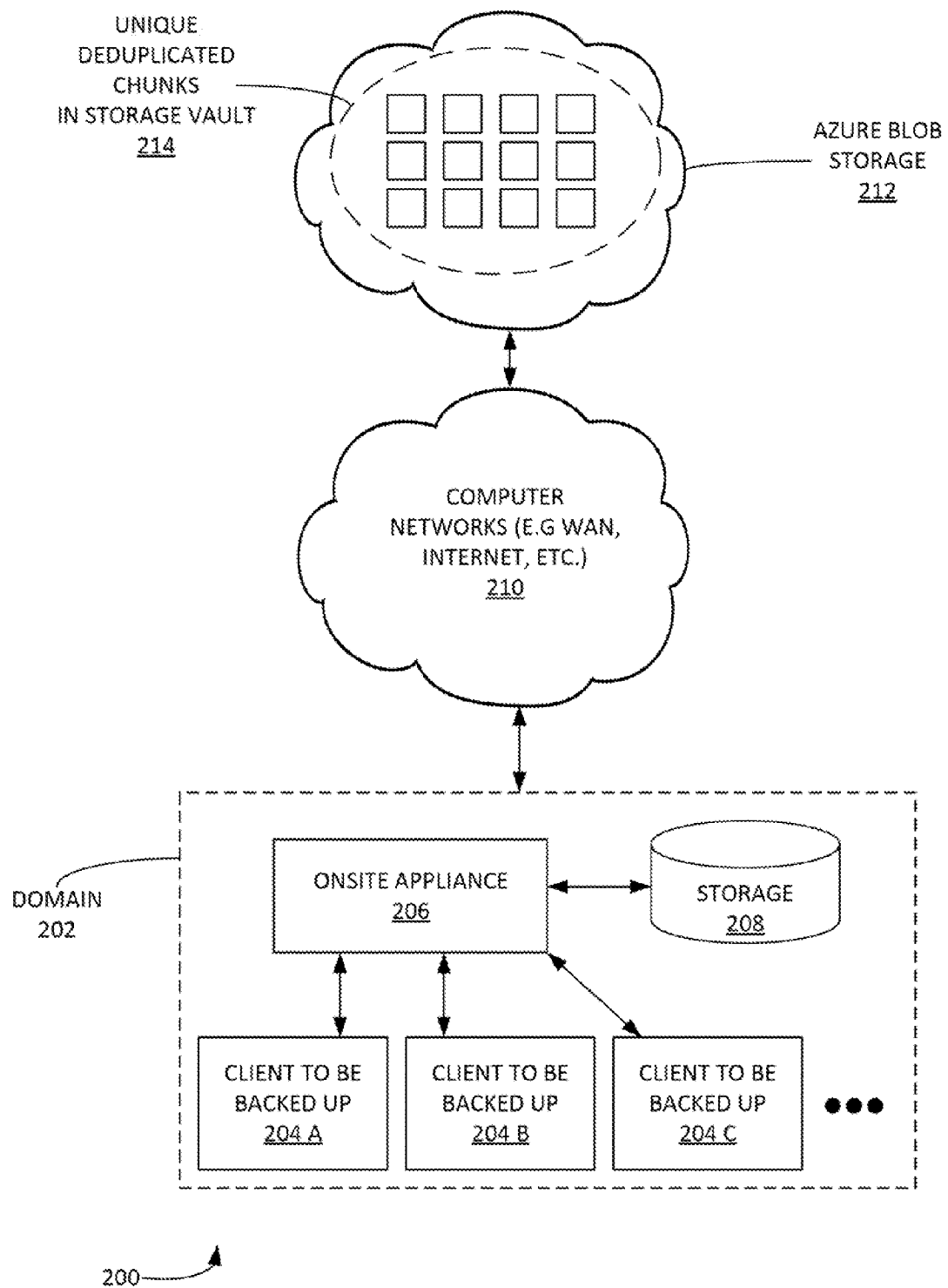
FIG. 2 illustrates another example system of cloud-based data and/or application recovery with an NTFS system, according to some embodiments.

FIG. 2 illustrates another example system 200 of cloud-based data and/or application recovery with an NTFS system, according to some embodiments. System 200 can include domain 202. For example, domain 202 can be a Windows® domain (e.g. a group of Windows-based computers). Domain 202 can include a set of physical servers and/or their applications, such as clients to be backed up 204 A-C. On-site appliance 206 can include pre-installed software that is plugged-in into the LAN of domain 202. On-site appliance 206 can be configured to work with a user selected cloud vendor. On-site appliance 206 can discover the physical servers and applications clients 204 A-C. On-site appliance 206 can capture the metadata and/or data of these applications on either a scheduled periodic basis and/or demand based as invoked by the user. On-site appliance 206 can analyze this metadata and/or data using a pluggable deduplication engine. The unique data blocks can then be uploaded to elastic storage on cloud (e.g. Azure® blob storage 212) via computer networks 210. The unique data blocks can be stored as unique de-duplicated chunks 214 in a storage vault of Azure® blob storage 212.

Figure 3:
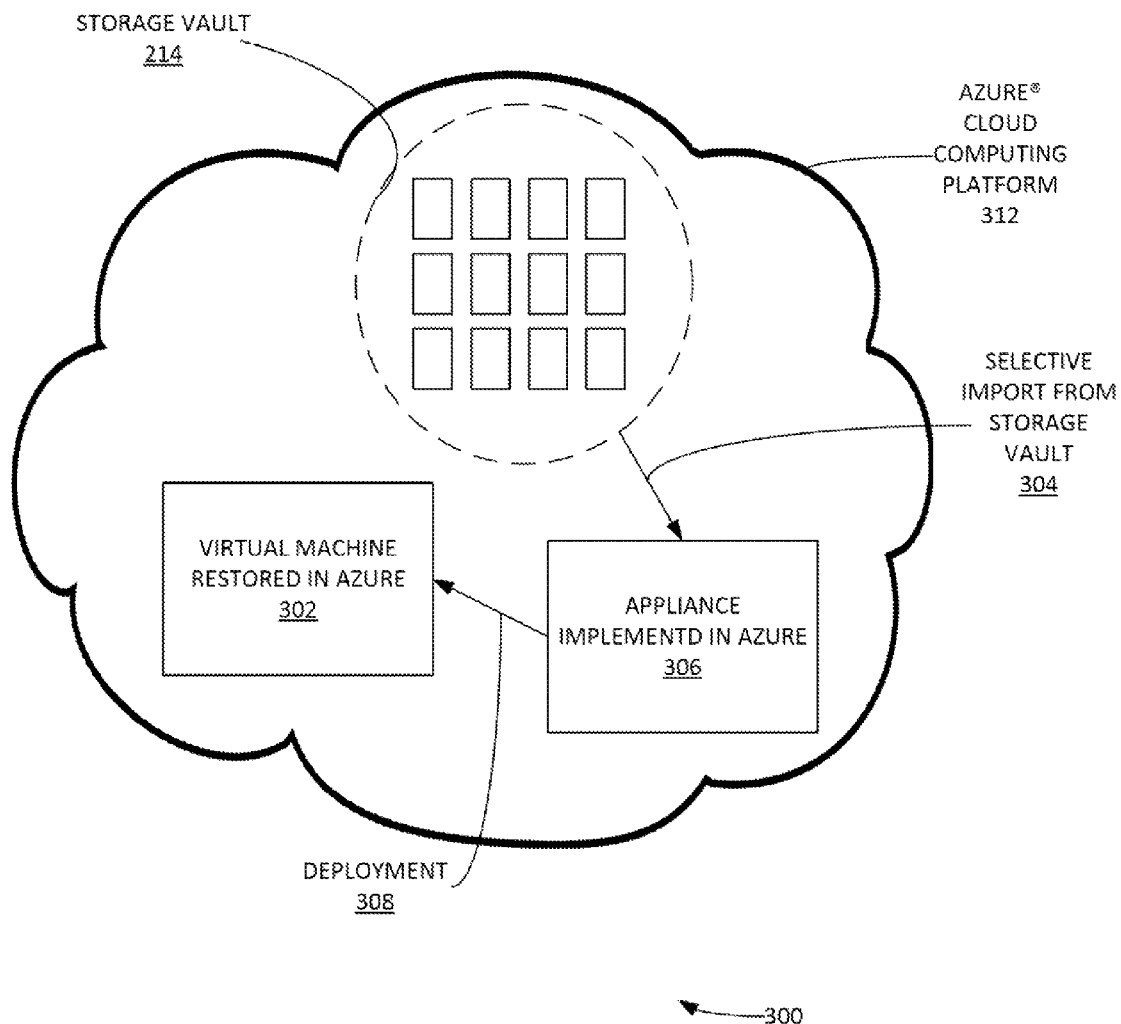
FIG. 3 illustrates an example system of Microsoft Azure® blob storage, according to some embodiments.

FIG. 3 illustrates an example system 300 of Azure® cloud computing platform 312, according to some embodiments. Unique de-duplicated chunks 214 can be in a storage vault of Azure® cloud computing platform 312 (e.g. can include Azure® blob storage 212). A process 304 of selective import from storage vault can be performed. The import can be to a version of the appliance implemented in the Azure® cloud computing platform 312. A deployment process 300 can then be implemented to configure a virtual machine 302 restored in the Azure® cloud computing platform 312. It is noted that although the present example of systems 200 and 300 are implemented in an Azure® cloud computing platform, other examples can be modified for other cloud computing platforms. According the present examples of FIGS. 2 and 3 are provided by way of example and not of limitation.

Figure 4:
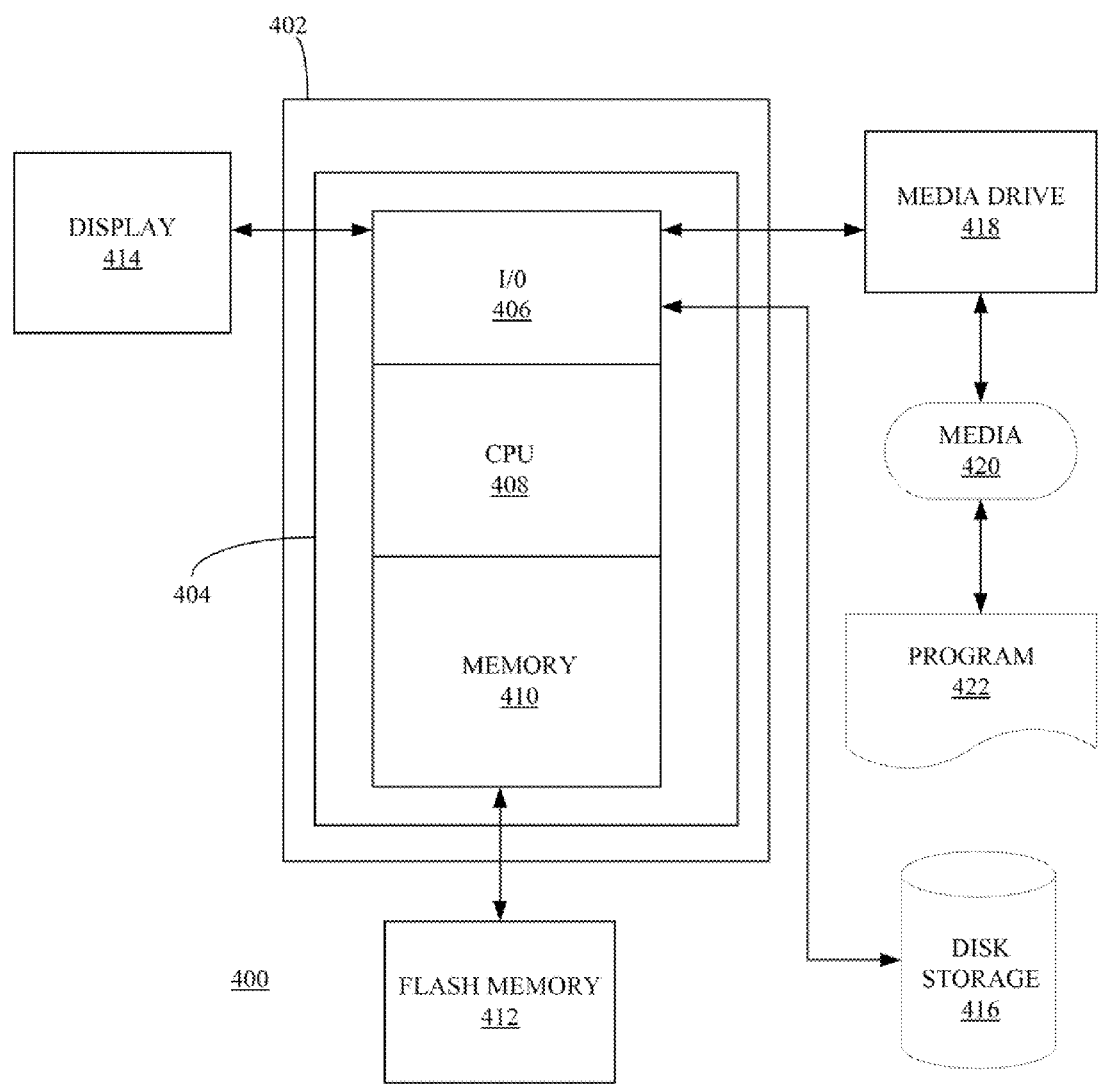
FIG. 4 depicts computing system with a number of components that may be used to perform any of the processes described herein.

FIG. 4 depicts an exemplary computing system 400 that can be configured to perform any one of the processes provided herein. In this context, computing system 400 may include, for example, a processor, memory, storage, and I/O devices (e.g., monitor, keyboard, disk drive, Internet connection, etc.). However, computing system 400 may include circuitry or other specialized hardware for carrying out some or all aspects of the processes. In some operational settings, computing system 400 may be configured as a system that includes one or more units, each of which is configured to carry out some aspects of the processes either in software, hardware, or some combination thereof.

FIG. 4 depicts computing system 400 with a number of components that may be used to perform any of the processes described herein. The main system 402 includes a motherboard 404 having an I/O section 406, one or more central processing units (CPU) 408, and a memory section 410, which may have a flash memory card 412 related to it. The I/O section 406 can be connected to a display 414, a keyboard and/or other user input (not shown), a disk storage unit 416, and a media drive unit 418. The media drive unit 418 can read/write a computer-readable medium 420, which can contain programs 422 and/or data. Computing system 400 can include a web browser. Moreover, it is noted that computing system 400 can be configured to include additional systems in order to fulfill various functionalities. Computing system 400 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

It is noted, after the system is recovered on the cloud by the cloud appliance, the cloud-appliance can be configured to regularly backup the recovered system running on the cloud. Accordingly, multiple images corresponding to the system running on the cloud can be captured and stored by the cloud appliance. The cloud-appliance can detect the unique data chunks of these backup images and uploads these chunks to the cloud storage. The cloud-appliance can integrate with the cloud infrastructure APIs to discover any other systems running in the cloud. The cloud-appliance can be configured to regularly backup these systems (e.g. are manually created in the cloud).

It is noted, that after the system is recovered and running on the cloud, the cloud-appliance can back up the system regularly. The system can upload unique chunks to cloud storage. In the event a user would like a server image back on the on-site premises, the following steps can be performed. At the location where the customer wants the image back, the user can power-on another on-site appliance and configure it to regularly download new unique data chunks from the cloud storage. When all the unique data chunks for an image are downloaded, the on-site appliance can restore this image.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computer-implemented method comprising:
    communicatively coupling with an application-server local area network (LAN);
    discovering the physical servers in the application-server LAN;
    discovering applications running in one or more physical servers in the application-server LAN;
    capturing: the application data: and the application metadata;
    parsing the application data and the application metadata;
    identifying the unique data blocks of the application data and the application metadata;
    uploading the unique data blocks to a cloud-computing platform;
    determining that the one or more physical servers running the application data and the application metadata is no longer available in the application-server LAN;
    placing a cloud-based appliance in the cloud-computing platform in an operational state;
    identifying a cloud-based application associated with the application data and the application metadata;
    receiving an instruction from a user, wherein the instruction comprises a selection of the application associated with the application data and the application metadata;
    synthesizing the unique data blocks of the application data and the application metadata stored in the cloud-based platform;
    reformatting the application data and the application metadata into a native format supported by the cloud-based platform; and
    providing the cloud-based appliance is associated with the application data and the application metadata, wherein the cloud-based appliance, and wherein the cloud-based application manages an implementation of a cloud-based version of the application, and wherein a pluggable deduplication engine in the on-site appliance computing device chunks a backup data stream of the application-server, and wherein the pluggable deduplication engine determines the unique data blocks of the backup data stream to the cloud-computing platform using a message-digest hashing algorithm, and wherein each chunk comprises a specified fixed size.

2. The computer-implemented method of claim 1 further comprising:
    enabling a user-side computing device to access the cloud-based version of the application and the associated application data and the application metadata.

3. The computer-implemented method of claim 2, wherein the application data and the application metadata are captured by an on-site appliance computing device physically coupled with the application-server LAN.

4. The computer-implemented method of claim 3, wherein the on-site appliance computing device uploads the unique data blocks to a cloud-computing platform.

5. The computer-implemented method of claim 4, wherein the pluggable deduplication engine determines the unique data blocks of the backup data stream to the cloud-computing platform using a cryptographic hash function.

6. The computer-implemented method of claim 5, wherein after the application is recovered on the cloud by the cloud appliance, the cloud-appliance can be configured to regularly backup the recovered application running on the cloud.

7. The computer-implemented method of claim 6, wherein one or more multiple images correspond to the application running on the cloud are captured and stored by the cloud-based appliance.

8. The computer-implemented method of claim 7, wherein the cloud-based appliance detects one or more unique data chunks of one or more multiple images and uploads the one or more unique data chunks to the cloud storage.

9. The computer-implemented method of claim 8, wherein the cloud-based appliance integrates with a cloud infrastructure application program interface to discover other systems running in the cloud-computing platform.

10. The computer-implemented method of claim 9, wherein the cloud-appliance is configured to regularly backup the other systems.

11. The computer-implemented method of claim 10, wherein after the appliance is recovered and running on the cloud-computing platform, the cloud-based appliance backs up the system regularly.

12. The computer-implemented method of claim 11, wherein the appliance can upload unique chunks to the cloud-computing platform, and wherein on the event a user requests a server image back on the on-site premises, the following steps can be performed:
 at the location where the user request the image, the user requests a power-on operation for another on-site appliance, the users configures the on-site appliance to regularly download new unique data chunks from the cloud storage, and when all a set of unique data chunks for an image are downloaded, the on-site appliance restores the image.

13. A computerized system comprising:
 a processor configured to execute instructions;
 a memory containing instructions when executed on the processor, causes the processor to perform operations that:
 communicate coupling with an application-server local area network (LAN);
 discover the physical servers in the application-server LAN;
 discover applications running in one or more physical servers in the application-server LAN;
 capture the application data and the application metadata;
 parse the application data and the application metadata;
 identify the unique data blocks of the application data and the application metadata;
 upload the unique data blocks to a cloud-computing platform;
 determine that the one or more physical servers running the application data and the application metadata is no longer available in the application-server LAN;
 place a cloud-based appliance in the cloud-computing platform in an operational state;
 identify a cloud-based application associated with the application data and the application metadata;
 receive an instruction from a use, wherein the instruction comprises a selection of the application associated with the application data and the application metadata;
 synthesize the unique data blocks of the application data and the application: metadata stored in the cloud-based platform;
 reformat the application data and the application metadata into a native format supported by the cloud-based platform; and
 provide the cloud-based appliance is associated with the application data and the application metadata, wherein the cloud-based appliance, and wherein the cloud-based application manages an implementation of a cloud-based version of the application, and wherein a pluggable deduplication engine in the on-site appliance computing device chunks a backup data stream of the application-server, and wherein the pluggable deduplication engine determines the unique data blocks of the backup data stream to the cloud-computing platform using a message-digest hashing algorithm, and wherein each chunk comprises a specified fixed size.

14. The computerized system of claim 13, wherein the application data and the application metadata are captured by an on-site appliance computing device physically coupled with the application-server LAN.

15. The computerized system of claim 13, wherein the on-site appliance computing device uploads the unique data blocks to a cloud-computing platform.

* * * * *